Feb. 16, 1926.
C. L. PAULUS ET AL
1,573,269
VERTICAL FINDER FOR AIRCRAFT
Filed July 17, 1924
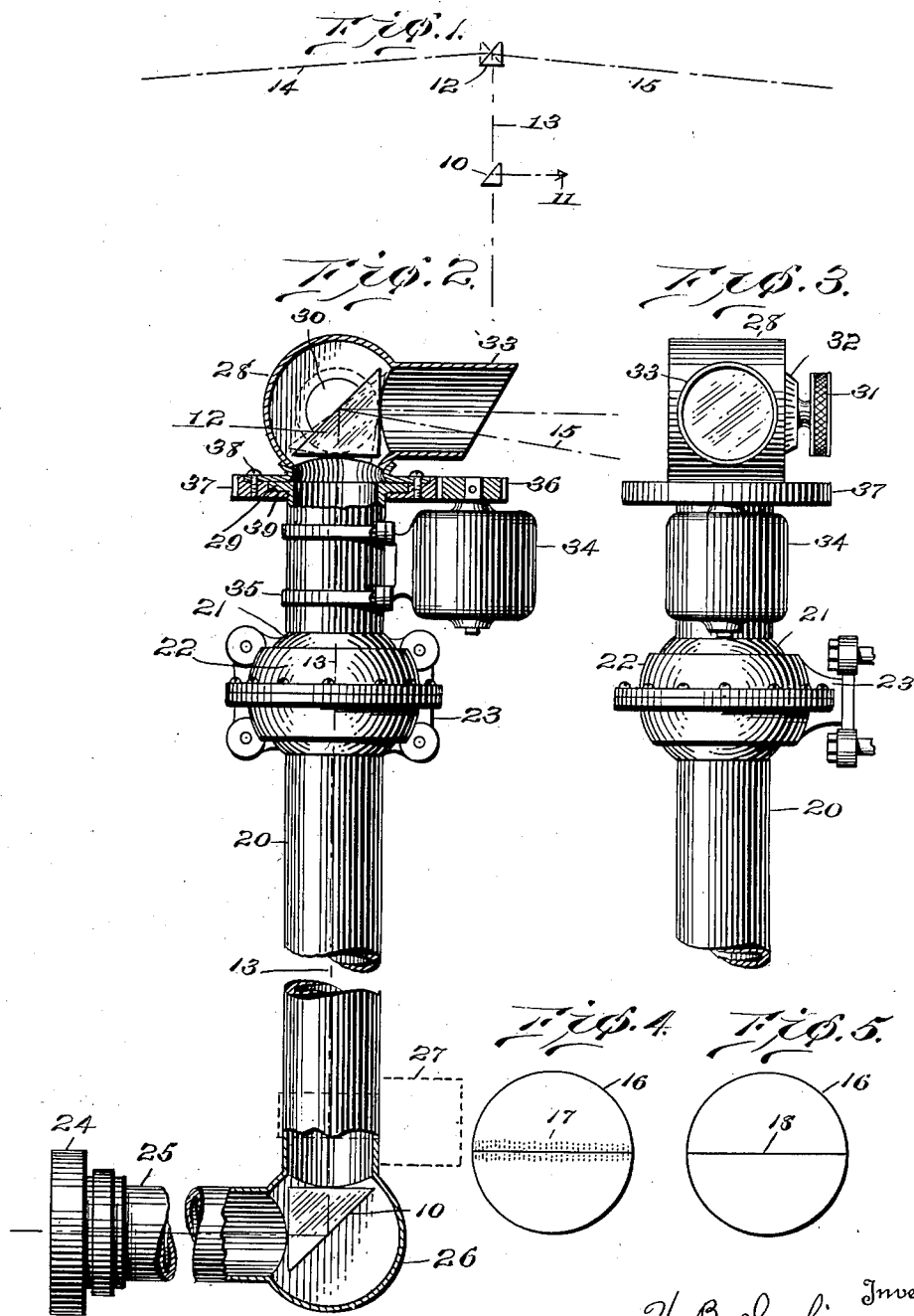

Patented Feb. 16, 1926.

1,573,269

UNITED STATES PATENT OFFICE.

CHARLES L. PAULUS, ROBERT KAUCH, AND HENRY B. INGLIS, OF DAYTON, OHIO.

VERTICAL FINDER FOR AIRCRAFT.

Application filed July 17, 1924. Serial No. 726,525.

*To all whom it may concern:*

Be it known that we, CHARLES L. PAULUS, ROBERT KAUCH, and HENRY B. INGLIS, citizens of the United States, residing at Dayton, in the county of Montgomery and State of Ohio, have invented certain new and useful Improvements in Vertical Finders for Aircraft, of which the following is a specification.

This invention relates to a vertical finder to be used on aircraft on bomb sights and other instruments and in calibrating and testing aeronautical instruments whose readings are based upon the inclination of the plane in flight, and which employ for this purpose gyroscopes, pendulums, or the like.

More specifically, the invention provides an instrument using the horizon as a point of reference which comprises a revolving reflector for sighting the horizon from which it is possible to determine the point of zero inclination by noting when the image of the horizon in the reflector approaches a fixed and approximately straight line, means being provided on the instrument for mounting an instrument to be calibrated, tested, or corrected, as the case may be.

The invention is illustrated in the accompanying drawing, in which:

Fig. 1 is a diagram showing the principle upon which the instrument operates.

Fig. 2 is a front view partly in elevation and partly in section of the instrument, certain portions being broken away.

Fig. 3 is a side elevation of the upper portion of the instrument.

Fig. 4 is a diagram showing an image produced when there is a slight inclination and the exact vertical is almost found, and Fig. 5 is a similar view showing an image produced when the tube is exactly vertical.

Throughout the views the same reference numerals are applied to the same parts.

Referring to Fig. 1, the instrument comprises a fixed reflector or prism 10 sighted horizontally with the eye. The image seen on the reflector 10 is reflected from a revolving reflector or prism 12 along a vertical line 13. The reflector 12 is adjusted to secure an image of the horizon along the lines 14 and 15. The adjustment of the reflector 12 is made to secure an image on the reflector 10 at about the middle of the circle 16, as shown in Figs. 4 and 5. In case the instrument is not quite vertical, but closely approaches this point of zero inclination, the image of the horizon in the reflector 10 will move as the reflector 12 is revolved, and will appear to the eye at 11 as a blurred or wavy line 17. The instrument is adjusted until the image in the reflector 10 appears as a fixed and approximately straight line 18 as shown in Fig. 5. At this point the reading of the instrument to be calibrated, tested, or corrected, is noted and in the case of an instrument already calibrated, if at the time the instrument is absolutely vertical, it does not show a zero inclination, the other readings will require corresponding corrections.

Referring now to Figs. 2 and 3, the device comprises a vertical tube 20 having a spherical portion 21 intermediate its ends, to be received in a socket 22 on a bracket 23 fixed to a convenient support in the fuselage of the plane or other aircraft. The tube 20 is capable of universal pivotal movement and may be turned slightly to suit the convenience of the observer who has the eye piece 24 to his eye. A tube 25 to which the eye piece 24 is clamped, communicates with a case 26 in which the fixed reflector or prism 10 is mounted. The latter has its reflecting surface inclined at an angle of approximately 45° to the horizontal so that sighting is along a horizontal line and the reflection of the image is along a vertical line at right angles. It is when the vertical line at 13 is truly vertical that an image such as that shown in Fig. 5 is secured in the reflector 10. At this time an instrument such as that designated by the numeral 27 indicated in dotted lines fixed upon the tube 20 is calibrated or corrected.

A revolving head 28 is rotatably mounted on a flange 29 at the upper end of the tube 20 and houses the reflector or prism 12. The prism 12 is generally similar to the prism 10 but is adjustable on trunnions 30 to secure the proper divergence of the line of sight 15 to secure an image of the horizon, varying under different atmospheric conditions, or at different elevations.

A knurled knob 31 is fixed on one of the trunnions 30 outside the head 28 for adjusting the prism. A calibrated dial 32 movable relative to an index on the head 28 may be provided so that a setting of the prism once made may be reproduced. A short guard tube 33 is provided communicating with the head 28 through which the horizon is sighted.

The prism 12 is revolved preferably by a small electric motor 34 held by clamps 35 upon the tube 20. A pinion 36 on the armature shaft of the motor 34 meshes with a gear 37 secured to the head 28 by screws 38. The gear 37 has a recess 39 to receive the flange 29 of the tube 20 to provide a swivel bearing for the head 28. It will be noted that the tube 25 extends oppositely from the motor 34 at the lower end of the tube 20 and offsets its weight sufficiently to maintain proper balance so that the tube does not tend of itself to any inclination.

We claim:—

1. In a vertical finder for aircraft, a laterally viewing reflector, means for mounting said reflector to rotate about a substantially vertical axis, revolving means for said reflector for constantly revolving the same at a rapid speed to secure a continuous image of the horizon, and a stationary sighting means vertically arranged relative to said reflector for viewing the image of the horizon on the reflector.

2. In a vertical finder for aircraft, a laterally viewing reflector, means for mounting said reflector to rotate about a vertical axis, revolving means for said reflector for constantly revolving the same at a rapid speed to secure a continuous image of the horizon, and a second reflector stationary and vertically arranged relative to said first reflector to reflect the image.

3. In a vertical finder, a support, a vertical tube adjustable in said support, a head revoluble on one end of said tube, a reflector viewing laterally mounted in said head, driving means for said reflector for continuously revolving the reflector at a rapid speed to secure a continuous image of the horizon, a casing fixed on the free end of said tube having a lateral sight opening, and a second reflector in said casing.

4. In a vertical finder, a support, a vertical tube universally adjustable in said support, a head revoluble on one end of said tube, a reflector viewing laterally mounted in said head, a motor mounted on said tube, gearing between said motor and said head for driving the latter, a casing on the opposite end of said tube, and a second reflector in said casing.

5. In a vertical finder for aircraft as set forth in claim 1, means for adjusting said reflector about a substantially horizontal axis.

In testimony whereof we affix our signatures.

CHARLES L. PAULUS.
ROBERT KAUCH.
HENRY B. INGLIS.